UNITED STATES PATENT OFFICE.

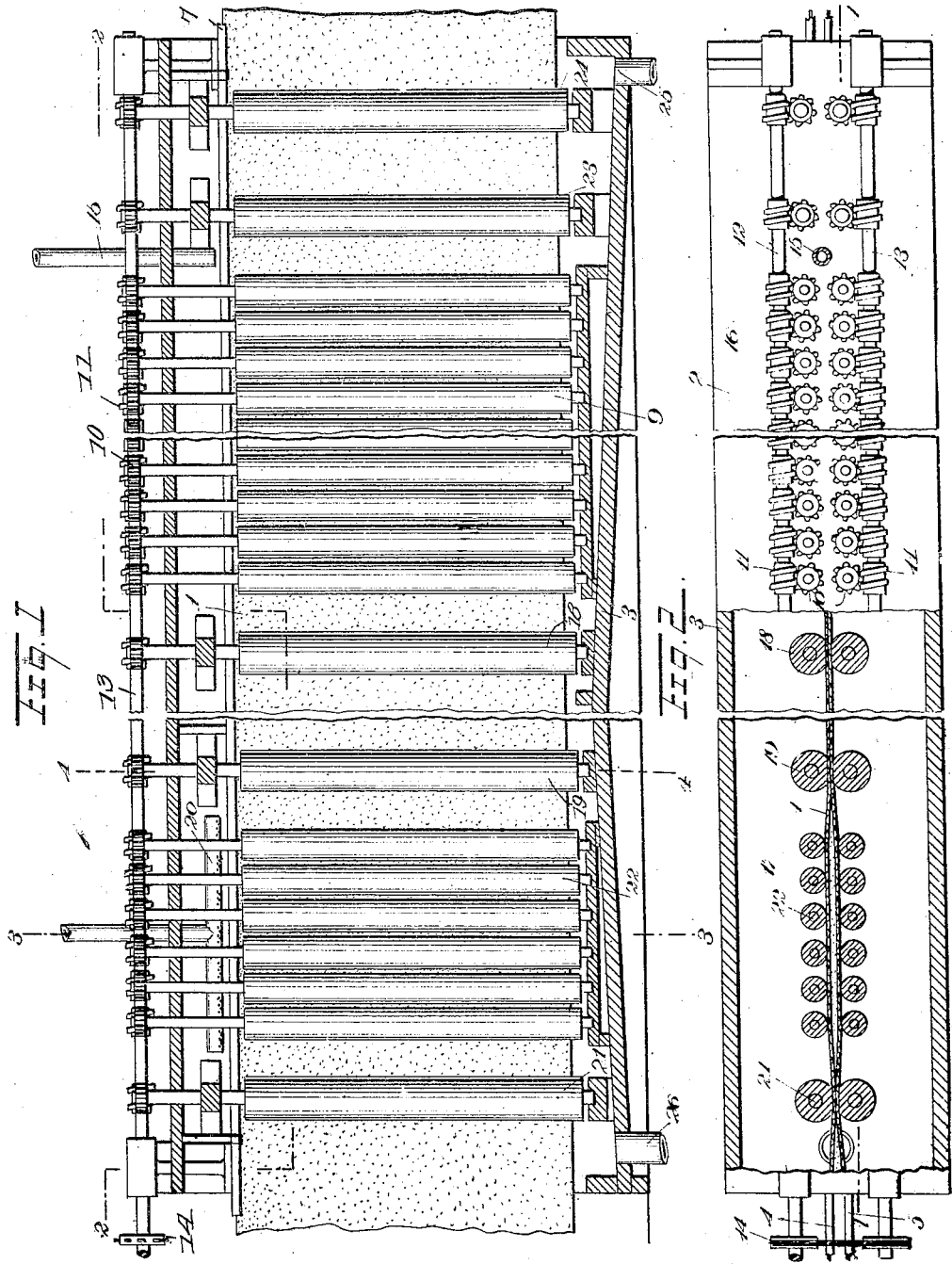

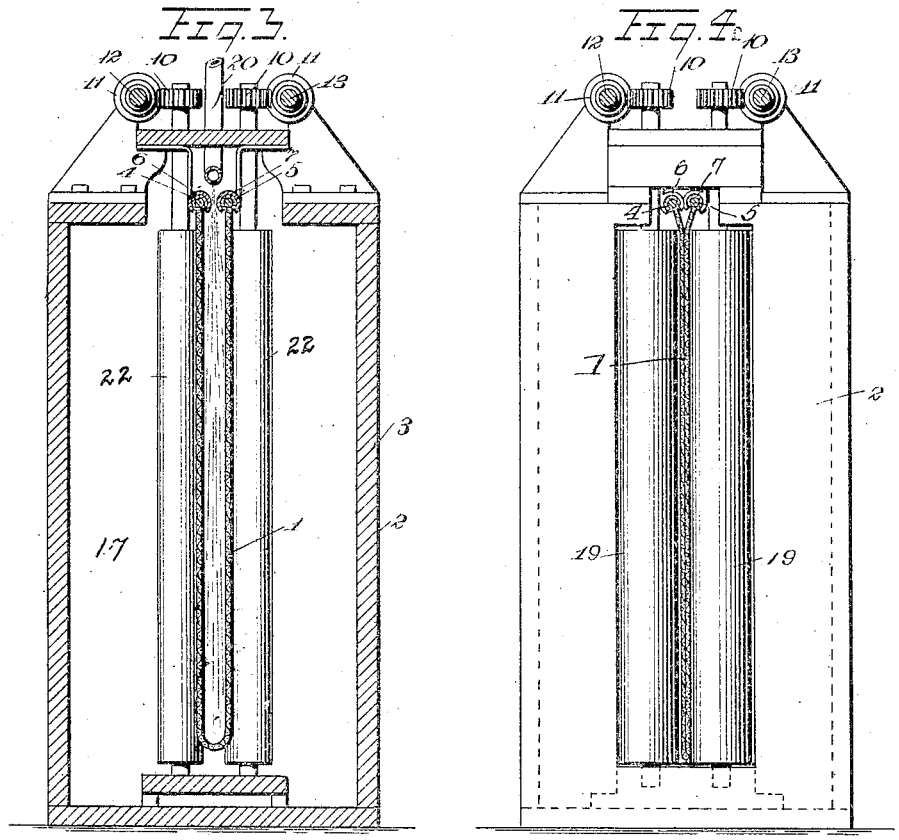
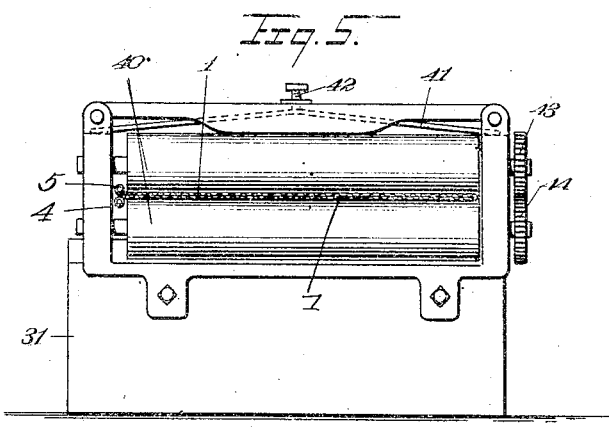

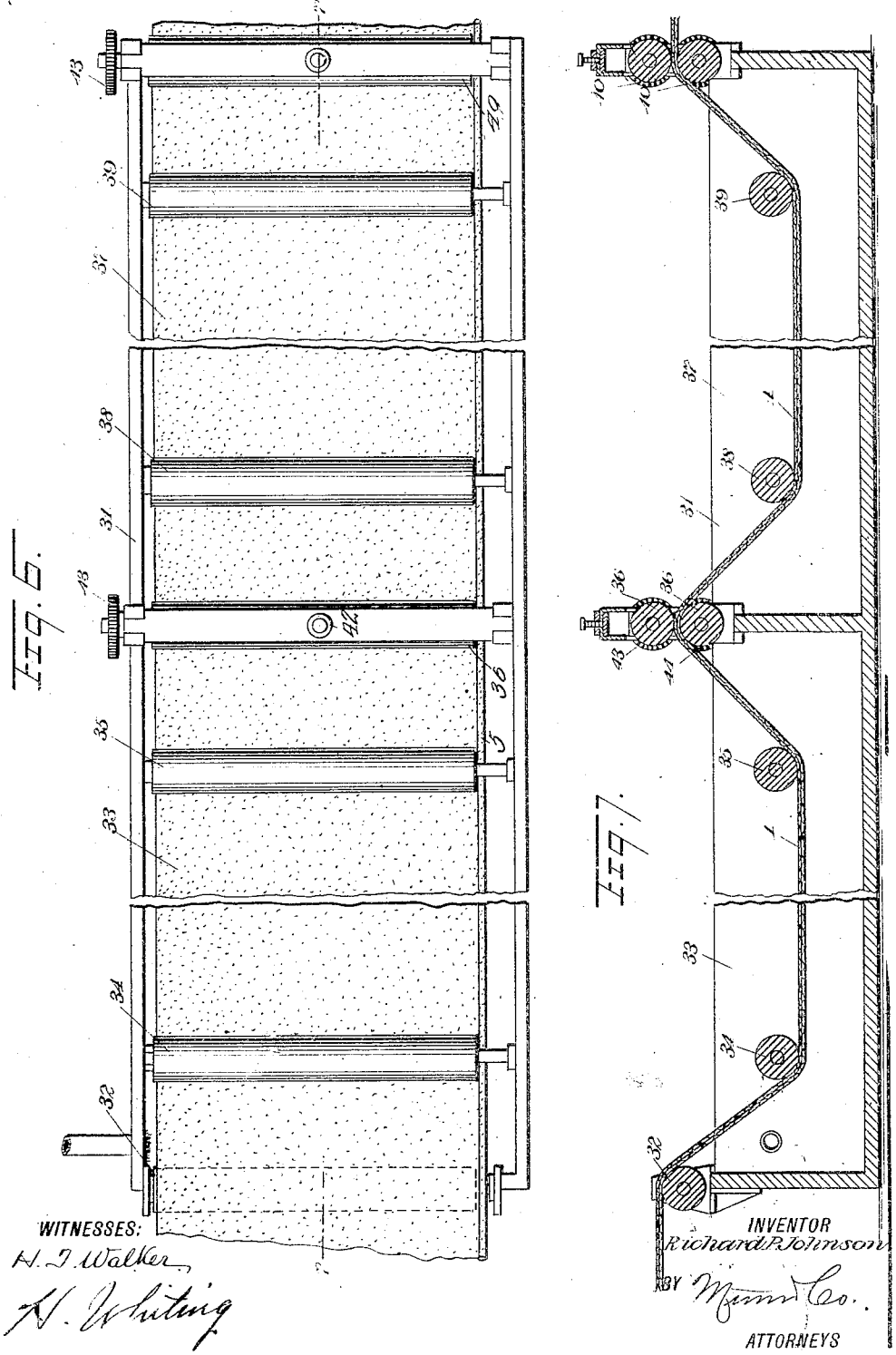

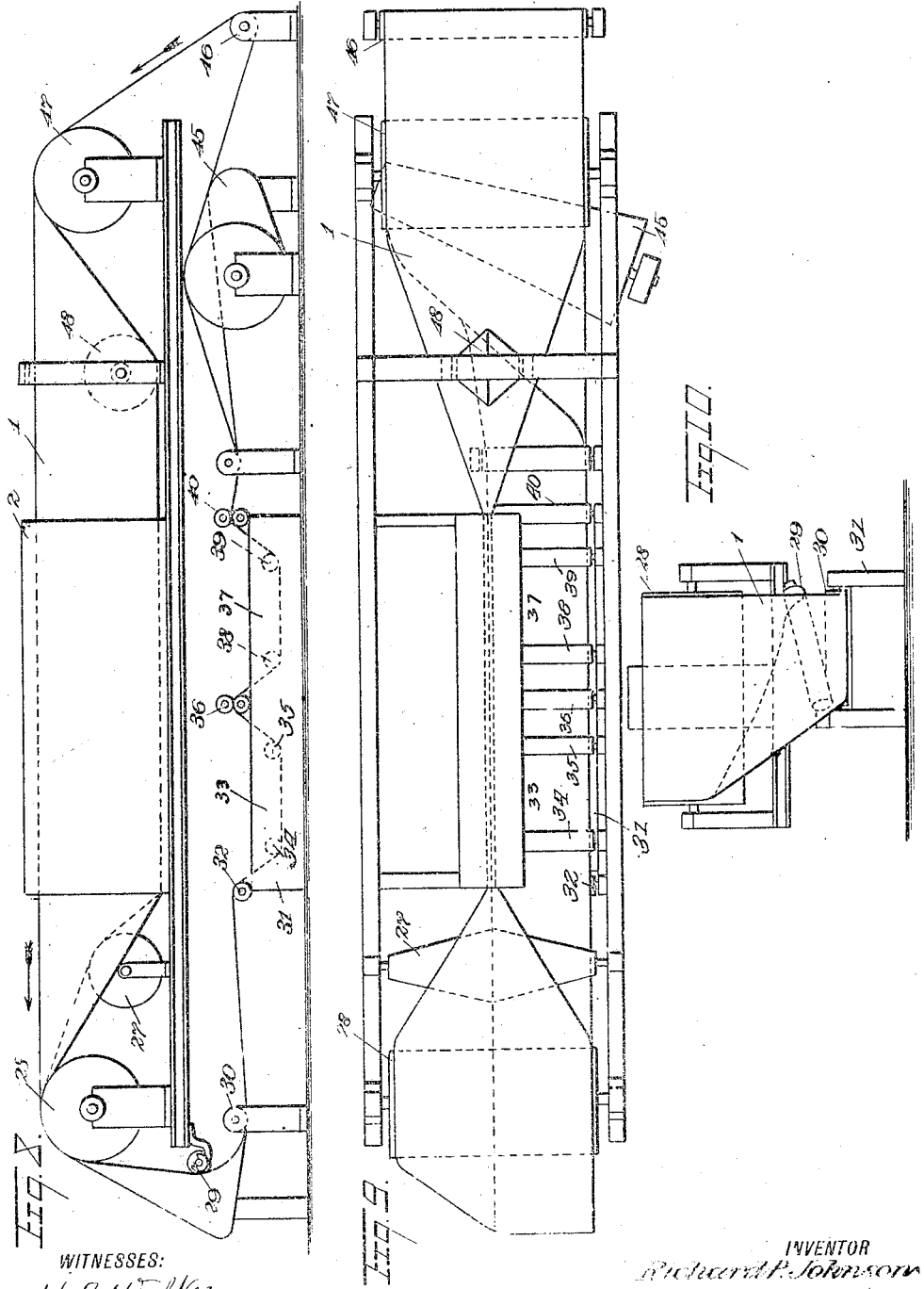

RICHARD PERRY JOHNSON, OF NEW YORK, N. Y.

FILTER.

1,038,382.  Specification of Letters Patent.  Patented Sept. 10, 1912.

Application filed March 13, 1911. Serial No. 613,962.

*To all whom it may concern:*

Be it known that I, RICHARD P. JOHNSON, a citizen of the United States, and a resident of the city of New York, borough of Brooklyn, in the county of Kings and State of New York, have invented a new and Improved Filter, of which the following is a full, clear, and exact description.

This invention relates to a new and improved filter which may be used for filtering any suitable material, but which has been found to be particularly efficient in filtering sugar.

An object of this invention is to provide a new and improved filter which will offer successive clean surfaces to the material being filtered, and at the same time remove the surfaces clogged with the waste matter removed from the material being filtered.

A further object of this invention is to provide a new and improved filter with means for feeding a filtering member during the filtering operation, so as to remove the part clogged by the solution being filtered, and with means for washing the filtering member during its use.

A still further object of this invention is to provide an endless filtering member adapted to be continuously moved so as to offer successive clean portions to a solution being filtered and at the same time provide means for washing that portion of the filtering member which has become covered with the foreign matter from the solution being filtered.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and which—

Figure 1 is a vertical section on the line 1—1 of Fig. 2; Fig. 2 is a top plan view, partly in section, on the line 2—2 of Fig. 1; Fig. 3 is a vertical transverse section on the line 3—3 of Fig. 1; Fig. 4 is a vertical transverse section on the line 4—4 of Fig. 1; Fig. 5 is a detail view in elevation of the squeezing rolls on the washer; Fig. 6 is a fragmentary top plan view of the washer; Fig. 7 is a vertical section on the line 7—7 of Fig. 6; Fig. 8 is a diagrammatic view in side elevation of the whole system; Fig. 9 is a diagrammatic view in plan, of the system; and Fig. 10 is a diagrammatic view in end elevation, of the system.

Referring more particularly to the separate parts of the invention as embodied in the form shown in the drawings, 1 indicates a filtering member, which may be of any form and material suitable to filter the material desired. In this case, the device is shown as especially adapted to filter sugar, and the filtering member 1 may be in the form of a blanket. In this instance also, the filtering member is shown in the form of an endless blanket adapted to move continuously, so as to offer successive fresh surfaces to the solution being filtered. The blanket or filtering member 1 passes in folded form in the direction of the arrow in Fig. 8, in, at the right-hand side, and out, at the left-hand side of a filter 2. The form of the blanket in passing through the filter is more clearly shown in Fig. 3, where it will be seen that it is in the form of a loop, with the side edges of the blanket uppermost and the middle lowermost so as to form a receptacle, in which the solution being filtered can be held until it passes through the pores of the filtering member, leaving the dirt and foreign matter behind in the blanket. The solution passing through the blanket is collected in compartments in a casing 3, which forms the casing portion of the filter 2.

In order that the blanket or filtering member 1 may hold the position illustrated in Fig. 3, it is provided at its side edges with an enlarged portion, which may be produced by cable, rope or other flexible connections 4 and 5 being attached in any suitable manner to the side edges of the filtering member and passing in guides 6 and 7, which extend any suitable distance and support the side edges of the blanket uppermost, thereby suspending the remaining portion of the blanket, in the form of a continuous bag. The sides of this bag formed in this manner may be supported in any suitable manner, as by means of a series of vertical rollers 9, arranged on opposite sides of the bag and adapted to contact with the same without any excessive pressure. These rollers may be provided with worm wheels 10 at their upper ends, which are driven by suitable worms 11 on shafts 12 and 13. Any other suitable driving connection may be used if desired. These shafts 12 and 13 may be driven in unison by means of an interconnecting chain-and-sprocket gearing 14. The solution to be filtered may be supplied to the filtering bag thus formed, in any suitable manner, as by means of a pipe 15. The filter 2 is preferably divided into two sections, comprising the filtering sections just described, which may be indicated by the numeral 16, and a recovering section 17, in which any saccharine matter remaining in the bag may be recovered.

Interposed between the filtering section and the recovering section, there is provided a primary set of squeezing rollers, 18, which are adapted to squeeze all the fluid matter out of the bag before permitting it to leave the filtering section. In case, however, this set, by accident, should let some of the liquid pass, there is provided a second set of squeezing rollers 19, which will surely squeeze out all of the liquid in the bag. When the bag, after passing the second set of squeezing rollers 19, comes into the recovering section, it is supported in a similar manner to the filtering section, by sets of vertical rolls 22, which permit the sides of the bag to spread apart a sufficient distance so that they can be washed by means of a sprayer 20, which may be of any suitable form, and is shown in the form of a perforated pipe, adapted to project streams of water on the inner surface of the bag. For the purpose of description, this inner surface will be called the obverse side of the bag, to distinguish from the other side, which may be termed the reverse side.

After passing through the recovering section of the filter, the filtering member, still in the form of a bag, passes between a pair of squeezing rollers 21, which press out substantially all of the liquid in the bag. The rolls 22 and the pressing or squeezing rollers 18, 19 and 21 are connected to the shafts 12 and 13 in a similar manner by worm and worm-wheel gearing, so that the squeezing rollers will positively drive the filtering member 1 continuously between them. This action is aided by two sets of rollers 23 and 24, arranged in pairs on opposite sides of the filtering member, at the entrance to the filter in front of the supporting rolls 9. The pressure rollers arranged at each side of the sections form substantial closures for the ends of the bag formed by the filtering member, preventing leakage in any direction other than through the bag. The supporting rolls 9 and 22 need not be cylindrical, but may be given almost any other form that will serve the purpose for which they are provided.

It will be seen by reference to Fig. 1 that the bottom of the casing 3 is preferably formed with an apex located intermediate the filtering and the recovering sections, and sloping therefrom downwardly in opposite directions to outlets, indicated at 25 and 26, so that the pure saccharine matter or other fluid passing through the blanket can be separated from that which is diluted by the recovering spraying water. Any other suitable means of separating the fluid passing through the blanket in the separate sections of the filter, may be used.

In passing from the filter 2, the blanket is spread out by means of a spreader 27, which may be of any suitable form, and is shown in this case, as will be seen more clearly by reference to Figs. 8 and 9, in the form of a double conical roller. This spreader spreads out the blanket or filtering member so as to have the obverse side carrying the dirt and other matter filtered from the liquid, uppermost, when it passes from the spreader over a guide roll 28. From the guide roll 28, the filtering member passes over a folder 29, which may be of any suitable form, and in this case is shown in the form of a roll extending at an angle to the axis of the guide roll 28, or in other words, at an obtuse angle to the direction of travel of the filtering member. From this folding roll 29, the blanket passes over a guide roll 30, where it will be folded with its edges adjacent each other and with its obverse side facing outwardly on both sides. From the guide roller 30, the blanket, folded in this position, with the dirty side outermost and facing upwardly and downwardly, passes into a washer 31, which may be of any suitable character. In this case, the washer is shown as being provided with a guide roll 32, over which the blanket passes, and from whence it goes into a preliminary washing section 33 of the washer, where it is carried under the surface of the cleaning fluid by means of guide rolls 34 and 35. After passing through this preliminary washing section of the washer, the filtering member is squeezed between a set of squeezing rollers 36, so as to remove the greater portion, if not all, of the dirty solution adhering thereto. From these squeezing rollers, it passes into an auxiliary washing section 37 of the washer, and is carried beneath the surface of the washing fluid by suitable guide rolls 38 and 39. In passing from the washer, the blanket or filtering member is again subjected to a squeezing action by a set of squeezing rollers 40, which remove the greater portion, if not all, of the solution adhering thereto. These squeezing rollers 36 and 40 may be of any suitable character, such as that shown in Fig. 5, where it will be seen that they are held together, under a yielding pressure, by means of a spring 41, the tension on which may be adjusted in any suitable manner, as by means of a set screw 42. The rollers may be driven in unison by interconnecting gears 43 and 44, which in turn may be driven from any suitable source. It will thus be seen that in passing through the washer, the obverse or dirty side of the blanket or filtering member is always outermost, so that it will be exposed to the cleansing action while the reverse side is innermost.

After passing from the washer, the blanket or filtering member is opened out by an unfolder 45, which may be of any suitable form, and in this case is shown in the form of a conical roll set diagonally to the direction of travel of the blanket. The blanket, after being thus unfolded, is passed over guide rolls 46 and 47, from whence it passes to a bag-former 48, which is shown in the form of a double conical roll disposed above the blanket, having its lower surface at a point lower than the upper surface of said guide roll 47. From the bag-former 48, the blanket, in the form of a bag, passes into the filter 2, as previously described.

The operation of the device will be readily understood when taken in connection with the above description. The material to be filtered, such as a sugar solution, is fed, by means of the pipe 15, into the bag formed by the bag-former 48, where the clear solution passes through the filtering member and out into the tank formed by the casing 3, where it may be drawn off to the point desired. The dirt and foreign matter is collected on the surface of the blanket, and is carried along, while the blanket offers a continuous clean surface to the incoming solution. The saccharine matter is squeezed out of the blanket before leaving the filtering section of the filter, by double sets of pressing rollers, from whence it passes into the recovering section, where the blanket, still in the form of a bag, is washed by the sprayer, and the solution formed with such sugar as remains in the blanket and the spray water collected in the tank formed by the casing 3 at the opposite end thereof. Any liquid adhering to the blanket is squeezed out by the pressing rollers 21 before the blanket passes to the spreader 27, where it is opened out wide before passing to the folder 29, which folds it up double, with the dirty side outermost on the top and bottom. From the folder, the blanket passes into the washer 31, where it may be subjected to any number of separate washings, and the solution adhering to the blanket is removed by the pressing rollers. After passing through the washer, the blanket is spread out by the unfolder 45, and after passing over suitable guide rollers, is doubled up in the form of a bag by the bag-former 48, the upper edges of the blanket being held secure by means of the guides 6 and 7.

While I have shown one embodiment of my invention, I do not wish to be limited to the specific details thereof, but desire to be protected in various changes, alterations and modifications which may come within the scope of the appended claims.

Having thus described my invention, I claim as new and desire to secure by Letters Patent:—

1. The combination with a filtering member in the form of a continuous endless blanket, of means for manipulating said filtering member so as to offer successive portions thereof to a solution to be filtered, a washer for cleansing said filtering member, a bag-former for doubling said filtering member into the form of a bag, a spreader for opening out said filtering member from the bag form into a spread-out condition, a folder for bringing the edges of said filtering member together, and an unfolder for spreading out said filtering member.

2. The combination with a filter, of a filtering member for said filter, a washer for cleansing said filtering member, said filtering member being adapted to pass through said filter in the form of a bag with its obverse side innermost and its reverse side outermost, and mechanism interposed between said filter and said washer adapted to reverse said filtering member so as to bring said obverse side outermost and said reverse side innermost.

3. The combination with a filter, of a filtering member for said filter, a washer for cleansing said filtering member, said filtering member being adapted to pass through said filter in the form of a bag, with its obverse side innermost and its reverse side outermost, mechanism interposed between said filter and said washer adapted to reverse said filtering member so as to bring said obverse side outermost and said reverse side innermost, and mechanism interposed between said washer and said filter adapted to reverse said filtering member, so as to bring said filtering member in the form of a bag, with its obverse side innermost and its reverse side outermost.

4. The combination with a filter, comprising a casing, a series of erect rollers mounted in said casing, and means for driving said rollers, of a filtering member, in the form of a bag, extending between said rollers, said filtering member being open at the top and ends, and squeezing rollers adapted to force portions of the sides of said filtering member in intimate contact so as to produce a bag closed substantially on all sides and at the bottom.

5. The combination with a filtering member, of a series of pressure rollers adapted to bring the sides of said filtering member in intimate contact so as to divide the same into sections, and a series of supporting rollers contacting with said filtering member so as to support the sides thereof in each section.

6. The combination with a filtering member, of a series of pressure rollers adapted to bring the sides of said filtering member in intimate contact so as to divide the same into sections, a series of supporting rollers contacting with said filtering member so as to support the sides thereof in each section, means for supplying a liquid to one of said sections, and a sprayer for supplying a liquid to the other of said sections.

7. The combination with a filter comprising a filtering section and a recovering section, of a washer comprising a plurality of sections, a continuous endless filtering member adapted to pass continuously through said filter and said washer, accumulating dirt and extraneous matter from a solution being filtered in said filter, and having said dirt and extraneous matter washed off in said washer, and a bag-former for folding said filtering member in the form of a vertically-extending bag before passing into said filter.

8. The combination with a filter comprising a filtering section and a recovering section, of a washer comprising a plurality of sections, a continuous endless filtering member adapted to pass continuously through said filter and said washer, accumulating dirt and extraneous matter from a solution being filtered in said filter, and having said dirt and extraneous matter washed off in said washer, a bag-former for folding said filtering member in the form of a vertically extending bag before passing into said filter, and a spreader for spreading out said filtering member before passing from said filter to said washer.

9. The combination with a filtering member in the form of an endless apron or belt and having enlargements along its marginal edges, of tubular guides, open at one side, adapted to support said member by having said enlargements pass therein and said apron extend through said open sides.

10. The combination with a filtering member in the form of an endless apron or belt and having enlargements along its marginal edges, of tubular guides, open at one side, adapted to support said member by having said enlargements pass therein and said apron extend through said open sides, said guides being located in close parallel juxtaposition for some distance, and said apron depending therefrom in parallel widths to form a filtering bag, and rollers arranged on each side of said bag, for supporting the sides thereof, said rollers being spaced apart in pairs to permit said sides of said bag to be spaced apart from each other out of contact with each other.

11. The combination with a filtering member in the form of an endless apron or belt and having enlargements along its marginal edges, of tubular guides, open at one side, adapted to support said member by having said enlargements pass therein and said apron extend through said open sides, said guides being located in close parallel juxtaposition for some distance, and said apron depending therefrom in parallel widths to form a filtering bag, rollers arranged on each side of said bag, for supporting the sides thereof, said rollers being spaced apart in pairs to permit said sides of said bag to be spaced apart from each other out of contact with each other, and pressure rollers arranged in pairs on opposite sides of said bag, in close juxtaposition and at suitable intervals, for bringing the sides of said bag in intimate contact with each other.

12. The combination with a filtering member in the form of an endless apron or belt and having enlargements along its marginal edges, of tubular guides, open at one side, adapted to support said member by having said enlargements pass therein and said apron extend through said open sides, said guides being located in close parallel juxtaposition for some distance, and said apron depending therefrom in parallel widths to form a filtering bag, rollers arranged on each side of said bag, for supporting the sides thereof, said rollers being spaced apart in pairs to permit said sides of said bag to be spaced apart from each other out of contact with each other, pressure rollers arranged in pairs on opposite sides of said bag, in close juxtaposition and at suitable intervals, for bringing the sides of said bag in intimate contact with each other, and means for driving said rollers.

13. The combination with a filter, of an apron for forming a filtering member adapted to pass through said filter, a horizontally-disposed roller contacting with the under side of said apron and adapted to support the same, and a double conical roller contacting with the upper side of said apron, intermediate the side edges thereof, for folding said apron in the form of a bag.

14. The combination with a filter, of an apron for forming a filtering member adapted to pass through said filter, a horizontally-disposed roller contacting with the under side of said apron and adapted to support the same, and a double conical roller contacting with the upper side of said apron, intermediate the side edges thereof, for folding said apron in the form of a bag, the pivotal axis of said double conical roller being located below the pivotal axis of said first-mentioned roller.

15. The combination with a filter, of an apron for forming a filtering member adapted to pass through said filter, a horizontally-disposed roller contacting with the under side of said apron and adapted to support the same, a double conical roller contacting with the upper side of said apron, intermediate the side edges thereof, for folding said apron in the form of a bag, the pivotal axis of said double conical roller being located below the pivotal axis of said first-mentioned roller, a double conical roller located beyond said filter and contacting with the lower side of said apron, said first-mentioned conical roller being of a form in which the bases of the cones abut against each other to form a ridge intermediate the side edges of the roller, said ridge contacting with the under side of said apron intermediate the side edges thereof, so as to tend to unfold the same, and a cylindrical roller located beyond said last-mentioned conical roller, adapted to support said apron.

16. The combination with a filter, of an apron for forming a filtering member adapted to pass through said filter, a horizontally-disposed roller contacting with the under side of said apron and adapted to support the same, a double conical roller contacting with the upper side of said apron, intermediate the side edges thereof, for folding said apron in the form of a bag, the pivotal axis of said double conical roller being located below the pivotal axis of said first-mentioned roller, a double conical roller located beyond said filter and contacting with the lower side of said apron, said last-mentioned conical roller being of a form in which the bases of the cones abut against each other to form a ridge intermediate the side edges of the roller, said ridge contacting with the under side of said apron intermediate the side edges thereof, so as to tend to unfold the same, a cylindrical roller located beyond said last-mentioned conical roller, adapted to support said apron, and a diagonally-disposed roller for folding said apron.

17. The combination with a filter, of an apron for forming a filtering member adapted to pass through said filter, a horizontally-disposed roller contacting with the under side of said apron and adapted to support the same, a double conical roller contacting with the upper side of said apron, intermediate the side edges thereof, for folding said apron in the form of a bag, the pivotal axis of said double conical roller being located below the pivotal axis of said first-mentioned roller, a double conical roller located beyond said filter and contacting with the lower side of said apron, said last-mentioned conical roller being of a form in which the bases of the cones abut against each other to form a ridge intermediate the side edges of the roller, said ridge contacting with the under side of said apron intermediate the side edges thereof, so as to tend to unfold the same, a cylindrical roller located beyond said last-mentioned conical roller, adapted to support said apron, a diagonally-disposed roller for folding said apron, a washer located beyond said diagonally-disposed roller, and a diagonally-disposed conical roller located beyond said washer, for unfolding said apron.

18. The combination with a filter, of a filtering apron passing through said filter, supporting rollers arranged on each side of said filter, for supporting said apron, and a conical roller located on each side of said filter, for folding and unfolding said apron, one of said conical rollers engaging the upper side of said apron and the other of said conical rollers engaging the under side of said apron.

19. The combination with a filter, of a filtering apron passing through said filter, supporting rollers arranged on each side of said filter, for supporting said apron, and a conical roller located on each side of said filter, for folding and unfolding said apron, one of said conical rollers engaging the upper side of said apron and the other of said conical rollers engaging the under side of said apron, said conical rollers having their maximum diameter intermediate their side edges and tapering gradually to a minimum diameter adjacent their side edges.

20. In a filtering apparatus, the combination of an endless belt or apron, means for moving the same, and means for folding the same into the form of a bag to receive the material to be filtered, said means engaging the said apron on the inner side intermediate its longitudinal edges, so as to cause the mid portion of said belt or apron to form the closed end or bottom of said bag when the said apron has been folded.

21. In a filtering apparatus, the combination of an endless belt or apron having a section thereof of bag-like form to receive a material to be filtered, means for moving said belt or apron, and means for engaging the outside of said bag-forming section adjacent the portion of said belt constituting the closed end of said bag-forming portion between the longitudinal edges thereof, to spread out the said belt or apron beyond said bag-forming section.

22. Filtering apparatus comprising an endless belt or apron, means for moving said belt or apron, means for spreading out said belt or apron, and means for engaging said belt or apron on the inside intermediate its longitudinal edges to fold the same longitudinally into bag-like form before the material to be filtered is supplied thereto.

23. In filtering apparatus of the kind described, the combination of an endless belt or apron having a section of bag-like form to receive the material to be filtered, means engaging said belt or apron intermediate its longitudinal edges adjacent the portion forming the closed end of said bag-forming section, for spreading out the same subsequent to the filtering operation, and means for reversely folding said filtering belt after the same is spread, for the purpose of cleaning the same.

24. In filtering apparatus of the kind described, the combination of an endless apron or belt, means for spreading the same out flat subsequent to the operation of filtering, means for engaging said apron in its spread-out condition and facilitating folding the apron and cleaning the same, means for again spreading out said apron after being folded and cleaned, and means for subsequently and reversely folding said apron or belt prior to the feeding of the material to be filtered, thereto.

25. The combination with a filter, of a filtering member for said filter, a washer for cleansing said filtering member, said filtering member being adapted to pass through said washer with its obverse side outermost and its reverse side innermost, and mechanism interposed between said washer and said filter after the filtering member leaves the washer, to reverse said filtering member so as to bring the reverse side outermost and its obverse side innermost.

26. In a filtering apparatus, the combination of an endless belt or apron, means for moving the same, and a double conical roller for folding the same into the form of a bag to receive the material to be filtered, said roller engaging the apron on the inner side thereof intermediate its longitudinal edges, so as to cause the mid portion of said belt or apron to form the closed end or bottom of said bag when the said apron has been folded.

27. In a filtering apparatus, the combination of an endless belt or apron having a section thereof of bag-like form to receive the material to be filtered, means for moving said belt or apron, and a double conical roller for engaging the outside of the bag-forming section adjacent the portion of said belt forming the closed end of the bag-forming portion between the longitudinal edges thereof, to spread out said belt or apron beyond said bag-forming section.

28. The combination with a filter, of a filtering member for said filter, means for moving said filter, means for spreading out said filter flat before entering said filtering member, and means for engaging said filtering member on the inside of the same and between the longitudinal edges thereof after it leaves the spreading-out means, to fold the same.

In testimony whereof I have signed my name to this specification in the presence of two subscribing witnesses.

RICHARD PERRY JOHNSON.

Witnesses:
H. WHITING,
PHILIP D. ROLLHAUS.